O. F. OLSON.
CALIPERS.
APPLICATION FILED FEB. 2, 1909.

936,024.

Patented Oct. 5, 1909.

WITNESSES
Helen M. Walsh
Joseph T. Brennan

INVENTOR
OSCAR F. OLSON
BY HIS ATTORNEYS
Mitchell, Chadwick & Kent

UNITED STATES PATENT OFFICE.

OSCAR F. OLSON, OF QUINCY, MASSACHUSETTS.

CALIPERS.

936,024.  Specification of Letters Patent.  Patented Oct. 5, 1909.

Application filed February 2, 1909. Serial No. 475,670.

*To all whom it may concern:*

Be it known that I, OSCAR F. OLSON, a citizen of the United States, residing at Quincy, in the county of Norfolk and State of Massachusetts, have invented new and useful Improvements in Calipers, of which the following is a specification.

This invention relates to calipers, dividers and other instruments of that class.

The object of the invention is to provide calipers or other articles of this type which may be quickly set at any desired degree of opening; or which may be changed from a particular setting and then easily and quickly returned to the same setting with precision, as when the calipers are used as transfer calipers.

The accompanying drawing and description show one embodiment of the invention as it may be applied to "outside" calipers; but the scope of the patent is not to be limited to the particular embodiment here shown and many variations may be made without departing from the scope of the invention.

Figure 1:
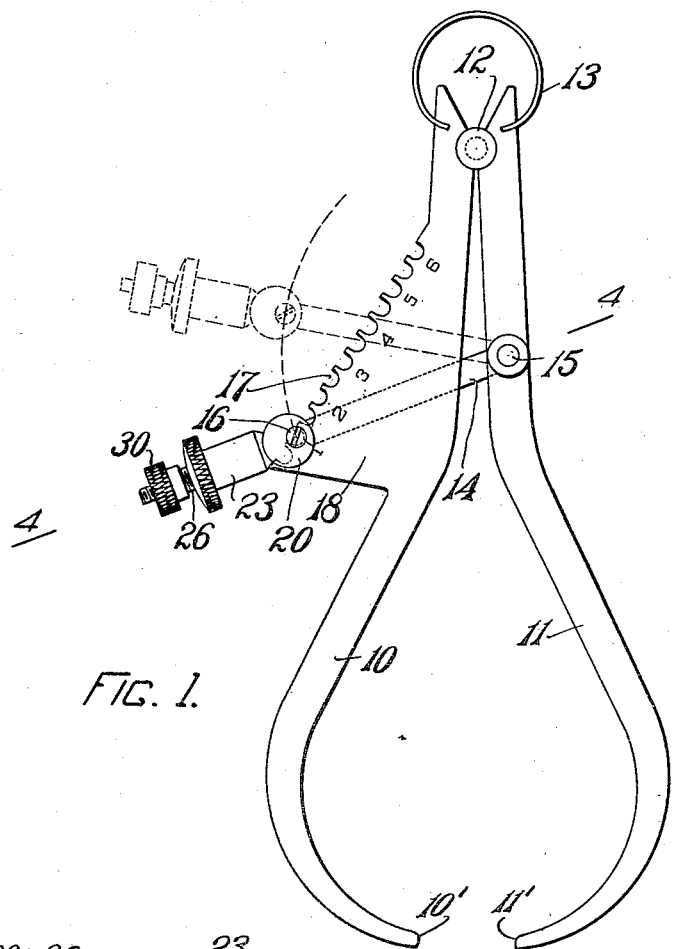
Figure 2:
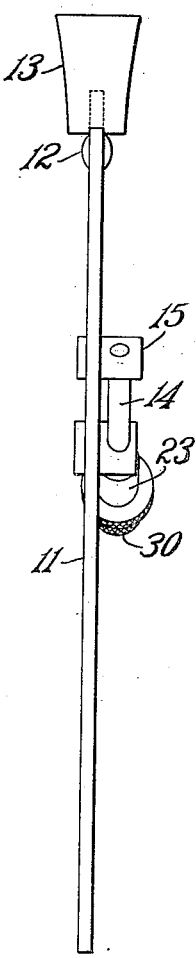
Figure 4:
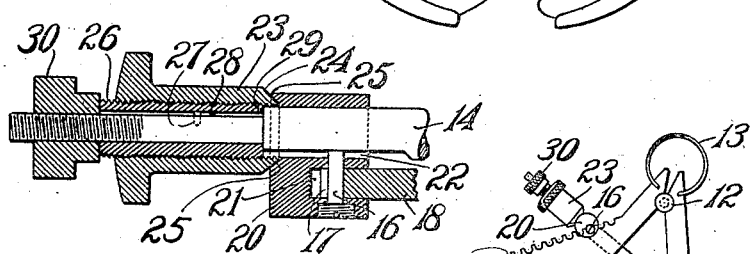
Figure 3:
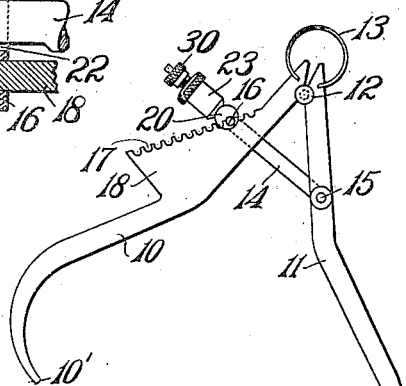

In the drawings, Figure 1 is a side elevation of calipers embodying the invention; Fig. 2 is an edge elevation of the same; Fig. 3 is a side elevation of the same on a reduced scale, with calipers open to a different degree; Fig. 4 is a section showing certain details enlarged on the line 4—4 of Fig. 1.

Referring to the drawings, the two arms of the calipers are marked 10 and 11 respectively, are pivoted or otherwise hinged together at 12 and are connected by a spring 13 which normally tends to force them apart in the manner already well-known. The action of the spring is restrained by a link or tie-rod 14, which at 15 is pivoted or otherwise fastened to arm 11 in such manner that it can swing toward and from the hinge 12. This link has a hook in the shape of a transverse pin 16 adapted to engage in any one of a series of notches 17 on the other arm 10. The notches 17 are set in a line progressively more distant from the pivot 15 and also progressively more distant from the hinge 12. This is arranged by extending the upper portion of arm 10 edgewise on the side remote from arm 11, forming a plate 18, on the remote edge of which are the notches 17. The pin 16 can be hooked into one of the more distant notches, as shown in Fig. 1, only when the arms 10 and 11 are near together. When they are open to a greater degree, the hook engages in one of the nearer notches, as shown in Fig. 3. The notches may be suitably spaced from each other to correspond with definite units of degrees of openings of the caliper points, and the scale of units to which they correspond may be marked adjacent to them as indicated in Fig. 1. In the instrument shown in the drawing the entrances of notches are at approximately regular and equal distances apart, but the notches vary slightly in depth, according to the depth in each case required to provide opening between caliper points of the specified amount when the hook pin 16 is seated therein. Each notch represents an opening of the caliper points 10', 11', a half inch different from their opening when the hook is in the next adjacent notch.

The hook is formed as follows: A block 20 which slides loosely in and out on link 14 has a notch or recess 21 parallel to the rod and wide enough to receive the edge of the plate 18 loosely. Pin 16 passes through this recess transversely and is firmly screwed into the block. The rod 14 which constitutes the link, may have a flat portion as at 22, and the presence of the end of pin 16 close to this flattened portion prevents the block from rotating on said rod 14; but as the pin is not tight against the rod the block is free to slide longitudinally of said rod. Such sliding thereon varies the length of the link. As illustrated in the drawing, the block is maintained in position on the rod against the action of the spring 13, by a screw nut 23, supported on the rod, the conical inner end 24 of which engages in a conical depression 25 in the outer end of the block. This nut 23 is mounted on a sleeve or bushing 26, which sleeve is loose to slide longitudinally of the rod 14. The sleeve may be prevented from rotating about said rod by a pin 27 set in the rod and working in an interior groove 28 in the sleeve. A shoulder 29 on rod 14 limits the inward movement of sleeve 26; and a screw nut 30 is provided on the end of rod 14 by which the sleeve 26 can be forced tight against shoulder 29. The nuts 23 and 30 constitute independent means for adjusting the length of the link. Either may be operated without disturbing the adjustment of the other. Under normal use, for adjusting the caliper points, this nut 30 is to remain tight, holding sleeve 26 firm and stationary against shoulder 29. Then by turning nut 23 the block 20 and hook pin 16 may be forced inward along rod 14, drawing the caliper arms and points together; or by turning the nut 23 in the opposite direction, the block may be allowed to slide outward, letting the calipers open under influence of spring 13. The length of inward travel of nut 23 from its extreme outward position should be at least sufficient to move the caliper points a distance equal to the unit distance they move when the block and pin 16 are transferred from one notch to the next adjacent notch. Thus by means of the notches a rough adjustment is immediately obtainable and a fine adjustment follows by turning the nut 23. The scale marked in connection with the notches may correspond to the caliper point distances when nut 23 is at its extreme outward position.

To use the calipers, let it be desired to open them rapidly from the setting shown in Fig. 1 to that in Fig. 3. Compressing the arms 10—11 slightly together unhooks arm 10 from pin 16 and enables the rod 14 to be swung out from the notch 17 in which it happens to be engaged, as indicated by the dotted lines and position of the rod in Fig. 1; and the arm 10 then flies outward opening the caliper points until the hook engages such other notch as the operator chooses according to the adjacent scale. If the nut 23 be not changed in the meantime, the caliper points may be returned to precisely their former opening by merely hooking the rod again in the same notch from which it was taken.

To use the calipers as "transfer calipers", as for example to measure the thickness of a disk which is concave on both sides, so that when ordinary calipers touch both sides of the center they cannot be removed without disturbing their adjustment, these calipers may be utilized as follows: The nut 30 being tight against sleeve 26, which makes the sleeve tight against shoulder 29, the calipers are adjusted by use of nut 23. When ready to remove the calipers, nut 30 is loosened a few turns thus letting sleeve 26 slide outward on rod 14, carrying with it the nut 23. This allows block 20 to slide outward correspondingly. Then the link may be unhooked and the calipers may, in the manner described above, be opened as far as necessary to remove them from the object being calipered. The calipers, having been thus opened and removed, may then be restored precisely to the calipering position to which they were adjusted while on the object by hooking the pin into the same notch and then turning nut 30 until sleeve 26 is again seated against the shoulder 29 on rod 14. The calipers with their precise setting are thus transferred from their inaccessible position on the object to an accessible position where their opening can be directly measured.

I claim:

1. An instrument of the class described, having two arms hinged together and a link on one of them; there being a series of notches on the other, arranged in a succession progressively more remote from the hinge and from the first arm and adapted for engagement with the free end of the link, and means tending to hold the link in engagement therewith; the notches being arranged with their respective entrances in a straight line, and being of varying depth corresponding to equidistant points in the degrees of opening of the arms of the instrument.

2. An instrument of the class described, having two arms hinged together and a link attached to one and having a sliding hook adapted to engage the other at varying distances from the hinge; in combination with a spring actuating the arms; and a stop adjustable on the link, engaging the hook thereon and opposing the action of said spring.

3. An instrument of the class described, having two arms hinged together, and a link joining them; and a hook adjustable in position on the link constituting its means of attachment to one of the arms and adapted to engage that arm at varying distances from the hinge; a sleeve adapted to slide on the link and means to fasten it thereon in a certain position; and means located on the sleeve for adjusting the position of the hook.

4. An instrument of the class described, having two arms hinged together and a link joining them and means to adjust the effective length of the link; said link comprising a rod, and means whereby it engages both arms, a sleeve movable longitudinally on the rod and a nut adjustable on the sleeve; there being a nut and shoulder on the rod adapted to clamp the sleeve in a certain position; and there being means whereby the nut on the sleeve controls said means for engagement with one of said arms.

5. An instrument of the class described, having two arms hinged together and a link joining them and a spring actuating them; there being a part of the link movable longitudinally thereof and a stop adjustable on said longitudinally movable part and adapted to oppose said spring and means to limit the motion of said movable part in a direction opposed to the spring.

6. An instrument of the class described, having two arms hinged together, and a link joining them and a spring acting on the arms and opposed to the link; said link comprising a rod pivoted to one arm, a block slidable on the rod, and a pin set in the block and adapted to engage the other arm; the rod having a flat place close to the pin, comprising means to prevent the block from rotating on the rod; and means to stop the movement of the block in the direction of the spring.

7. An instrument of the class described, having two arms hinged together, and a link joining them and a spring actuating them in opposition to the link; the link being attached to one and adapted to engage the other at varying distances from the hinge; there being two means to adjust the effective length of the link while continuing so engaged, each operable without disturbing the adjustment of the other.

8. An instrument of the class described, having two arms hinged together, and a link joining them and a spring actuating them in opposition to the link; the link being composed of a rod attached to one arm and having means to engage the other arm; there being a sliding sleeve on the rod and a nut controlling it; and a nut on the sleeve; each nut opposing said spring.

9. An instrument of the class described, having two arms hinged together, a spring actuating them, and a link joining them; the link being composed of a rod attached to one arm, and a block sliding on the rod adapted to engage the other arm; there being on the rod a movable stop for the block opposed to the spring, said stop being adjustable in position by rotation and also by sliding in approximately the direction of the axis of rotation.

Signed by me at Boston, this twenty-ninth day of January 1909.

OSCAR F. OLSON.

Witnesses:
 EVERETT E. KENT,
 JOSEPH T. BRENNAN.